(12) United States Patent
Leung et al.

(10) Patent No.: US 6,546,518 B1
(45) Date of Patent: Apr. 8, 2003

(54) DETECTOR ERROR SUPPRESSION CIRCUIT AND METHOD

(75) Inventors: Michael Leung, Sunnyvale, CA (US); Leo Fu, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/549,458

(22) Filed: Apr. 14, 2000

Related U.S. Application Data

(60) Provisional application No. 60/134,909, filed on May 19, 1999.

(51) Int. Cl.[7] ............................................. G11B 20/18
(52) U.S. Cl. ......................... 714/769; 360/53; 714/811
(58) Field of Search ............................. 360/53; 714/769, 714/811

(56) References Cited

U.S. PATENT DOCUMENTS

| | | | |
|---|---|---|---|
| 5,689,532 A | 11/1997 | Fitzpatrick | 375/341 |
| 5,774,470 A * | 6/1998 | Nishiya et al. | 714/703 |
| 5,844,741 A * | 12/1998 | Yamakawa et al. | 360/65 |
| 5,938,790 A * | 8/1999 | Marrow | 714/795 |
| 5,949,831 A * | 9/1999 | Coker et al. | 375/341 |
| 5,961,658 A * | 10/1999 | Reed et al. | 714/746 |
| 6,052,248 A * | 4/2000 | Reed et al. | 360/53 |
| 6,185,175 B1 * | 2/2001 | Zook | 369/53.35 |

FOREIGN PATENT DOCUMENTS

| | | |
|---|---|---|
| JP | 11025602 | 1/1999 |
| WO | WO 0007187 A | 2/2000 |

OTHER PUBLICATIONS

Perd: Partial Error Response Detection; IEEE Transactions on Magnetics, US, IEEE Inc. NY, vol. 31, No. 6, Nov. 1995; pp. 3042–3044.

Turbo–EEPRML: An EEPR4 Channel with an Error–Correcting Post–Processor Designed for 16/17 Rate Quasi–Mtr Code, IEEE Global Communications Conference, US, New Yor, NY; IEEE, 1998, pp. 2706–2711.

Turbo–PRML: A Compromise EPRML Detector; IEEE Transactions on Magnetics, US, IEEE Inc. New York, vol. 29, No. 6, Nov. 1, 1993; pp. 4018–4020.

* cited by examiner

*Primary Examiner*—Stephen M. Baker
(74) *Attorney, Agent, or Firm*—Carlton H. Hoel; W. James Brady; Frederick J. Telecky, Jr.

(57) ABSTRACT

Device and method of EEPR4 post processing in an EPR4 detection system to remove single bit errors by applying $1+D$ to the samples and comparing this to $(1-D)(1+D)^3$ to the detected EPR4 bits.

2 Claims, 7 Drawing Sheets

DETECTOR ERROR SUPPRESSION CIRCUIT AND METHOD

RELATED APPLICATIONS

This application claims benefit of provisional application Ser. No. 60/134,909, filed on May 19, 1999.

BACKGROUND OF THE INVENTION

The invention relates to electronic devices, and, more particularly, to digital communications and storage with partial response sequential detectors.

FIG. 1a schematically illustrates a magnetic storage and retrieval system. In particular, writing data bits to storage on magnetic disk 111 proceeds as follows. Error correction coder 101 encodes data bits into error corrected bits by an error correction encoding method such as Reed-Solomon. Further, the error correction coding may include interleaving of blocks of bits. Next, modulation coder (channel coder) 103 codes blocks of bits output by error corrected coder 101 into blocks of bits using a runlength-limited code or other channel code which may include a parity bit for post processing removal of dominant errors. This modulation coding helps read timing recovery. These blocks may then be precoded. Then the (precoded) modulation coded bits drive the read/write head to set the magnetization orientation of domains on spinning magnetic disk 111; this stores the data bits.

The reading of the stored data bits first amplifies (and filters) with amplifier 121 voltages induced in the read/write head 113 due to the transitions of magnetization orientation of domains on spinning disk 111. These voltages have the ideal form of a sequence of overlapping pulses, such as illustrated (after shape filtering) in FIGS. 2a–2c, with positive, negative, or zero amplitudes. The pulse overlaps imply intersymbol interference if the subsequent digital sampling includes contributions from more than one pulse; indeed, FIGS. 2a–2c indicate the ideal sampling times. Clocked analog-to-digital converter 123 samples and quantizes the sequence of pulses to form a digital output stream; there may be 64 or 128 quantization levels (a 6-bit or 7-bit converter with one sign bit and 5 or 6 magnitude bits). The Viterbi detector 125 performs a maximum likelihood data detection on the digital output stream.

For partial response signaling various classes of frequency response for the signal channel prior to detection have been defined; and the class IV response appears particularly suitable for magnetic recording due to pulse shapes requiring minimal equalization. The partial response class IV channel is defined by a channel transfer function polynomial of the form $(1-D)(1+D)^N$ where N is a positive integer and D is a one period delay. FIGS. 2a–2c shows the pulse shapes for N=1, 2, and 3; the corresponding pulses are termed PR4, EPR4, and $E^2$PR4 (or EEPR4), respectively. Thus an (E)PR4 sensed voltage consists of a sequence of overlapping (E)PR4 pulses spaced one period apart and with positive, negative, or zero amplitudes depending upon the corresponding transitions of magnetization domain orientations. The sampling of the (E)PR4 sensed voltage yields the digital stream input to the detector, typically a sequence detector such as a maximum likelihood Viterbi decoder. Higher storage densities on a magnetic disk require more samples per induced pulse and consequent more overlap, and thus the higher order polynomial transfer functions are used. For example, storage densities of about 3 bits per PW50 (pulse width at half maximum amplitude) would use EEPR4 which has four nonzero samples per pulse; see FIG. 2c. The demand for high density originates with small, portable devices such as notebook computers.

Modulation decoder 127 is the inverse of modulation coder 103. Lastly, error correction decoder 129 deinterleaves and further corrects errors and recovers the data bits, hopefully with only minimal errors.

Maximum likelihood detection of a digital stream with intersymbol interference can be described in terms of maximizing probabilities of paths through a trellis of state transitions (branches); each state corresponds to a possible pattern of recently received data bits and each stage of the trellis corresponds to a receipt of the next (noisy) input. For example, FIG. 3 illustrates one stage (one step in time) in the trellis for an EPR4 detector; the states are labeled with three previous data bits (reflecting the three non-zero sampled values in the isolated pulse) and the branches are labeled with the bit for the branch transition plus the corresponding noiseless input sample target values: 2, 1, 0, –1, or –2.

FIG. 4 shows a prior art Viterbi detector which includes one add-compare-select (ACS) unit for each trellis state and a branch metric unit for each of the target levels $t_{ij}$; the survival register for each state is in the path memories block. Each branch metric unit computes the square of the difference between its target value and the noisy input sample value. Each ACS stores a metric for its state and has inputs for the appropriate branch metric computations and the related state metrics from other ACS units. At receipt of an input signal to the detector, each ACS adds its (two) input branch metric computations to the corresponding state metrics of the states emitting the branches; and then it compares these (two) sums and selects the smaller as the updated state metric for its state. Each state's survival register updates its contents to maintain a survival path for the state; that is, the sequence of selected bits (transitions) that have led to the updated state metric. The detected bits will correspond to the path with the smallest metric. At any time the maximum likelihood path through the trellis up to that time is the path traced backwards through the trellis starting from the state with the smallest state metric at that time and recursively using the branch previously selected as the branch into the traced-to state. That is, the survival register contents for the state with the smallest state metric.

The length of the survival registers depends on the modulation code used. As the decision goes deeper into the survival registers, more of the contesting survival paths (versus the correct path) will be eliminated, the detected data will become more accurate.

To further improve the performance of (E)PR4 channels, modulation codes have been proposed which add code constraints to eliminate the most common error events. An error event metric may be defined as the difference between the path metric for the correct path and path metric for the contender error path through the trellis that diverges from the correct path and later remerges. In EPR4 channels the minimum squared Euclidean distance (metric) between paths equals 4. The following pairs of bit sequences have trellis paths with this minimum error event metric:

| | |
|---|---|
| 00100 and 01010 | (two consecutive transitions confused with four) |
| 11011 and 10101 | (complement of preceding) |
| 01011 and 00101 | (three consecutive transitions shifted) |
| 10100 and 11010 | (complement of preceding) |
| xx0xx and xx1xx | (single bit error) |

The first four errors have a common characteristic in that the error occurs when three or more consecutive transitions exist. Thus a modulation code which prevents three consecutive transitions (NRZI tribits) will preclude the foregoing errors except for the single bit error. However, removing all tribits yields a low code rate. Consequently, various codes such as W.Bliss, An 8/9 Rate Time-Varying Trellis code for High Density Magnetic Recording, Proc. 1997 IEEE Int. Mag. Conf. (April 1997) remove quadbits and limit tribits to certain positions within the codeword to regain code rate.

But the problem of suppression of single bit errors persists. One approach adds a parity bit to codewords, but this lowers the code rate.

SUMMARY OF THE INVENTION

The present invention provides a device and method of single bit error suppression by post processing after Viterbi detection using a filtering of the difference of the ideal samples from the detected bit stream and the detector input sample stream.

This has the advantages of increased accuracy with limited additional post processing.

BRIEF DESCRIPTION OF THE DRAWINGS

The drawings are heuristic for clarity.

DESCRIPTION OF THE PREFERRED EMBODIMENTS

System Overview

Figure 1A:
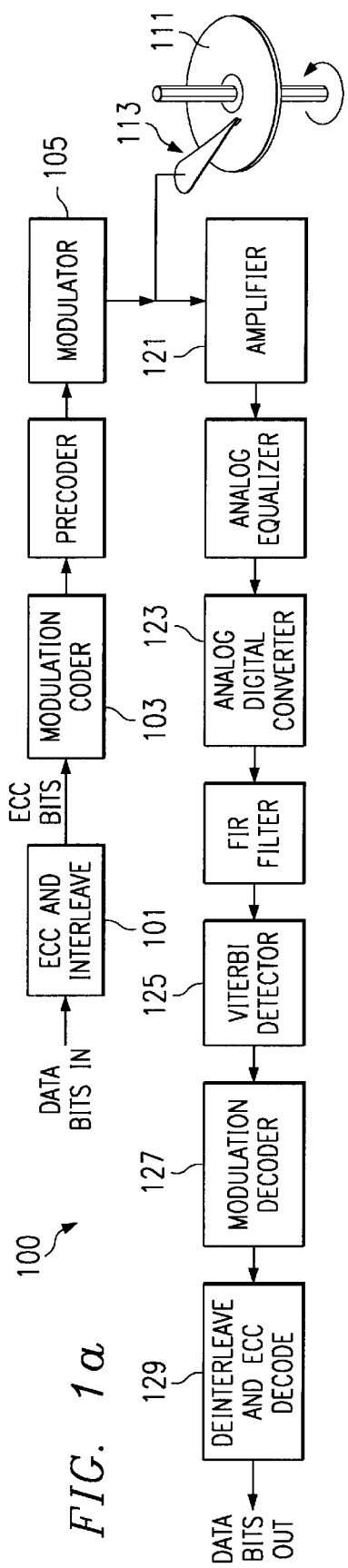
FIGS. 1a–1d schematically illustrates first preferred embodiment system.
Figure 1B:
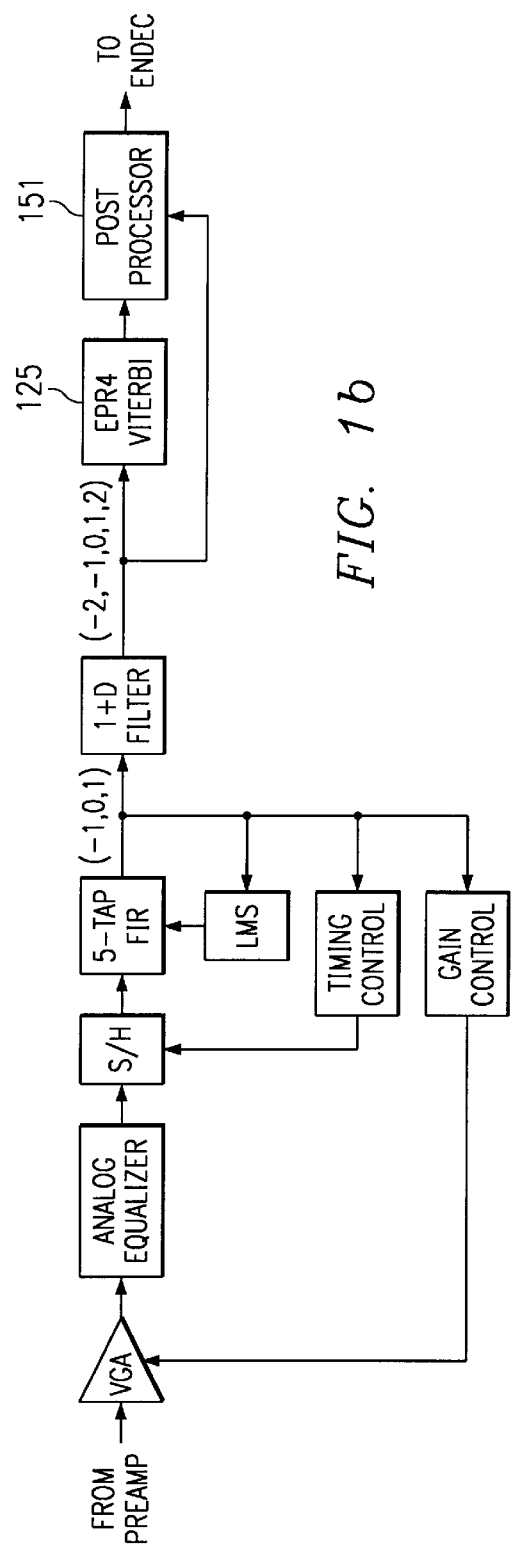
Figure 1C:
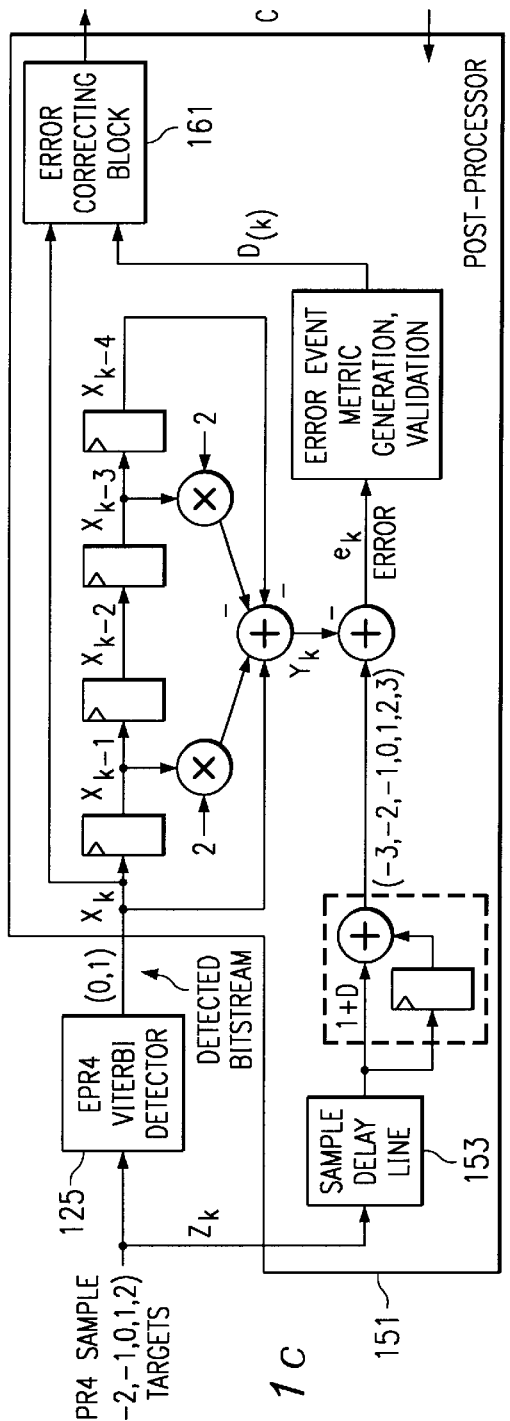
Figure 1D:
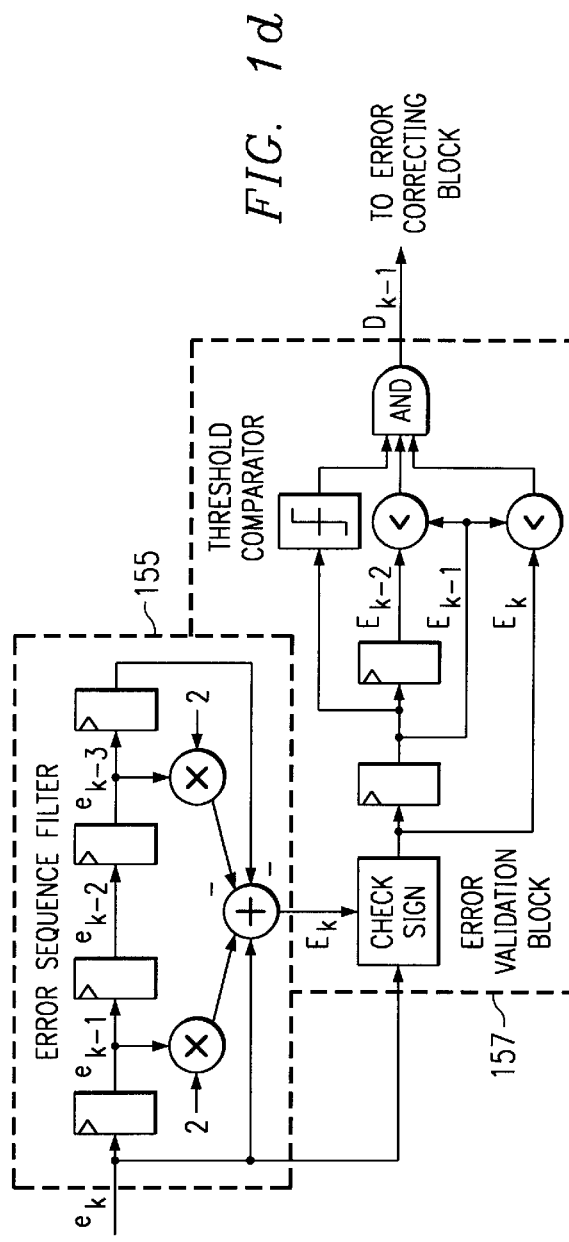
Figure 2A:
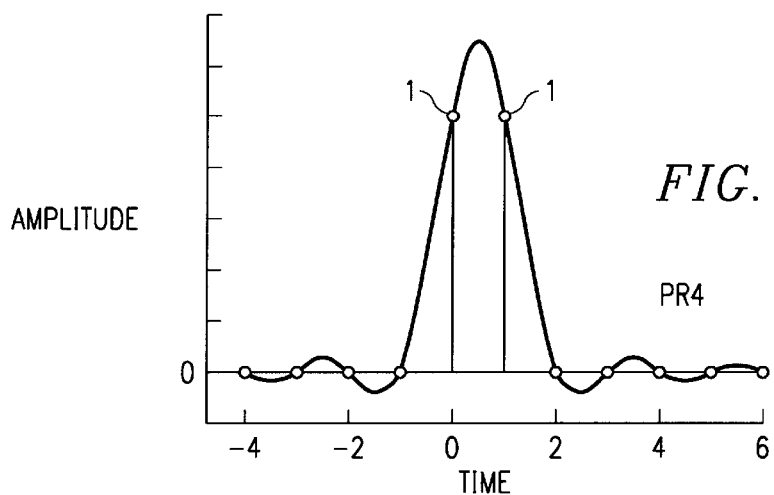
FIGS. 2a–2c shows partial response class IV pulses.
Figure 2B:
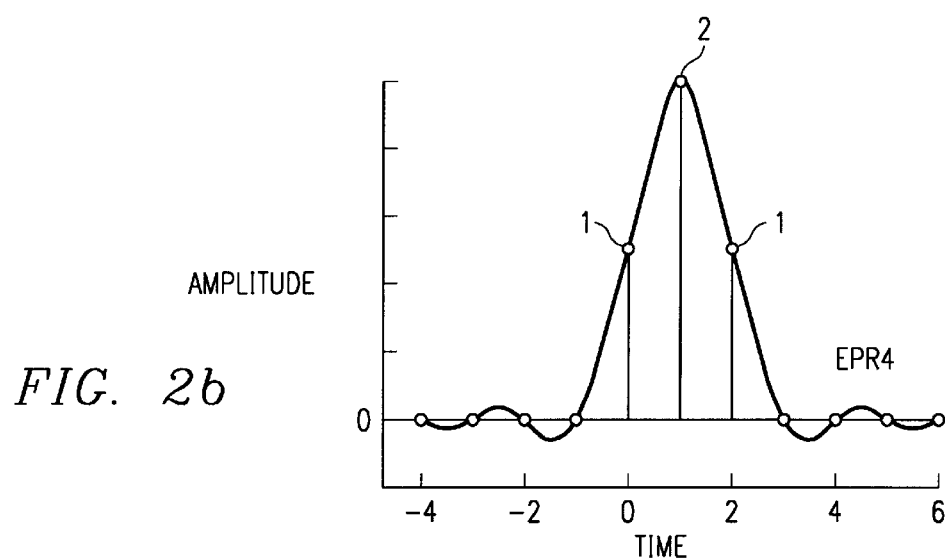
Figure 2C:
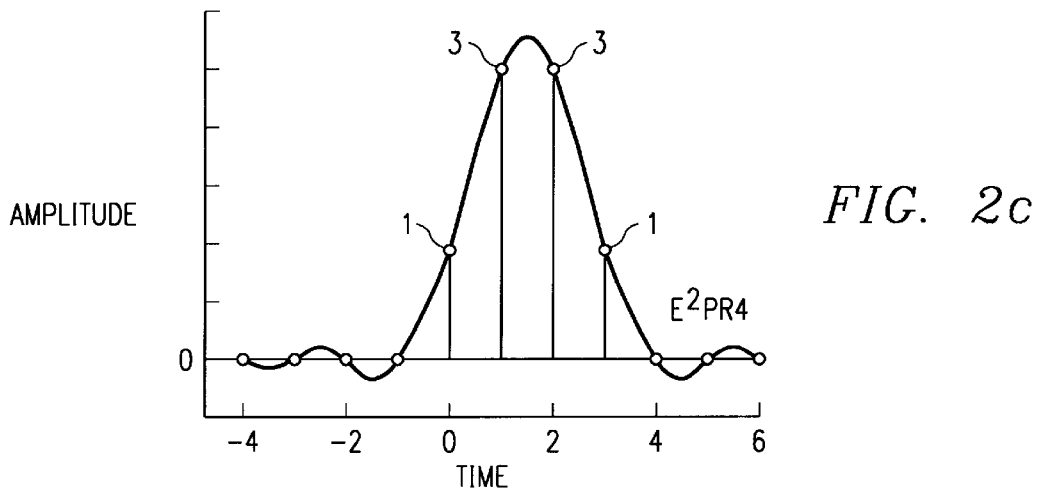
Figure 3:
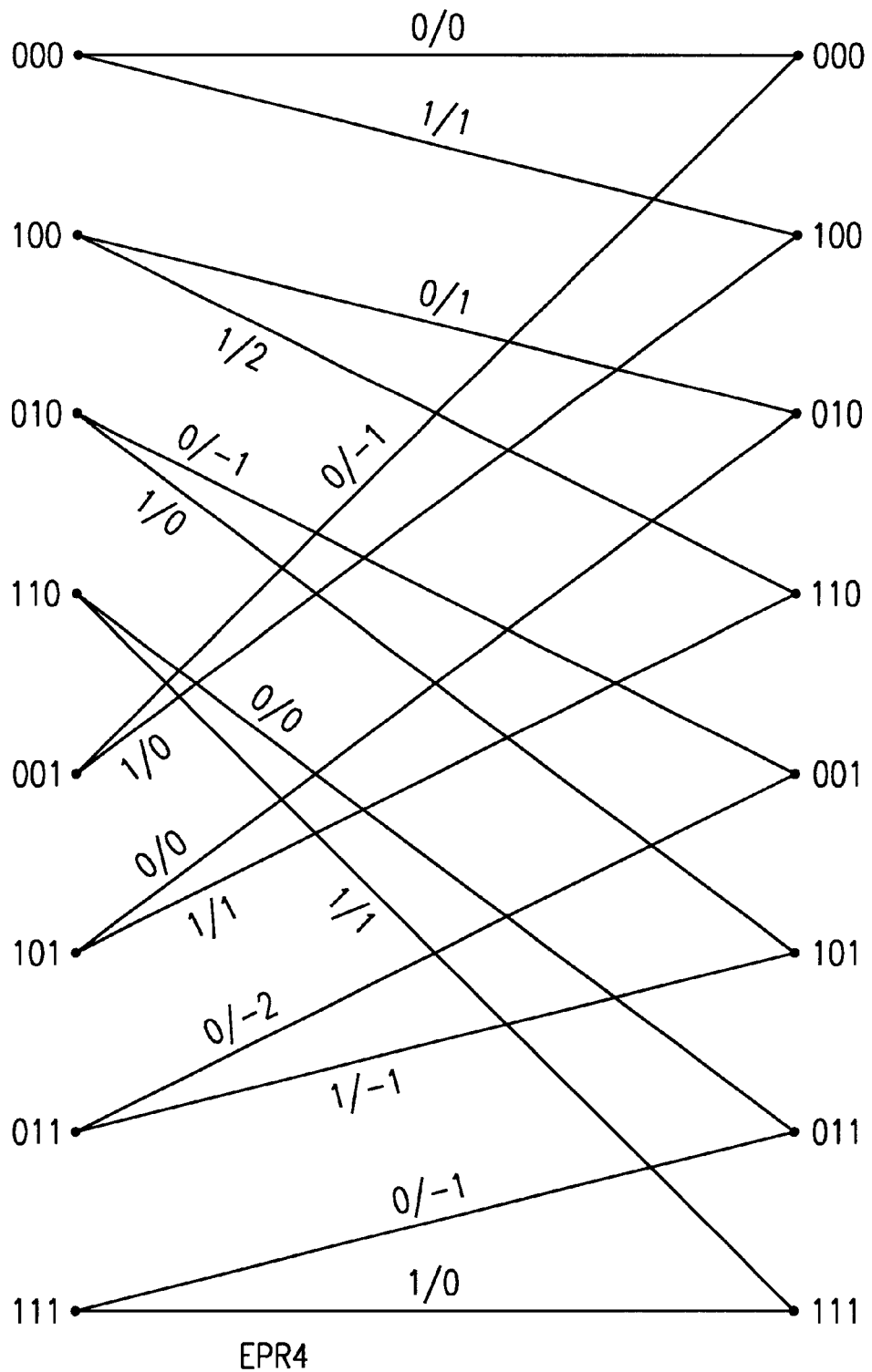
FIG. 3 illustrates a stage of an EPR4 trellis.
Figure 4:
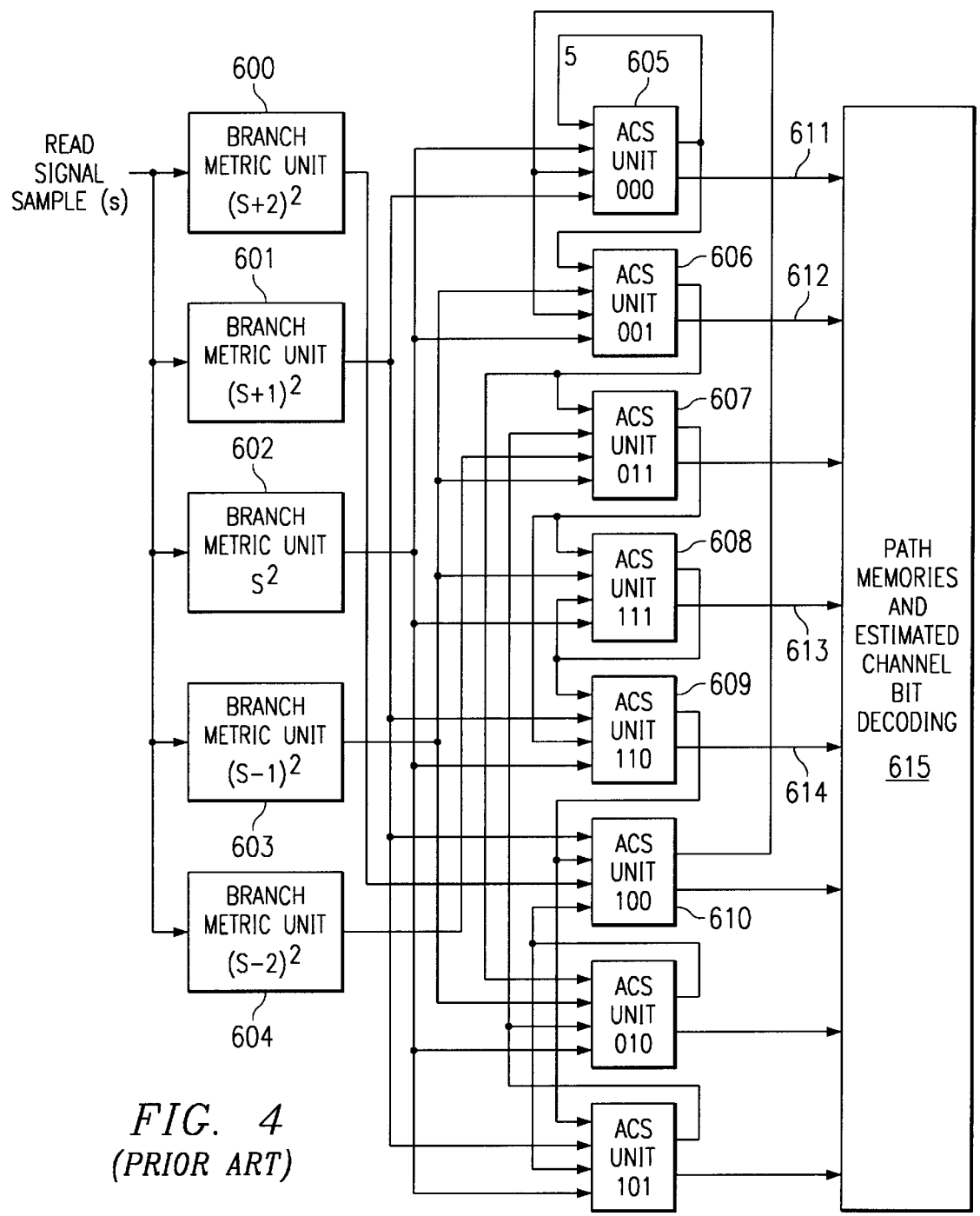
FIG. 4 shows a Viterbi detector.

As illustrated in FIGS. 1b–1d, the first preferred embodiments suppress single bit errors in an EPR4 channel by post processing after the initial EPR4 Viterbi detection. Post processor 151 (details in FIGS. 1c–1d) filters the detected bit sequence, filters the sample sequence prior to detection, and then filters the difference of the two filtered sequences to assess the likelihood of a single bit error. The particular filterings provide single bit error detection with low-complexity by using EEPR4-type filters. If the comparison indicates a likely single bit error, then the output is corrected.

First Preferred Embodiment

FIG. 1b is an overall preferred embodiment detector system block diagram showing an EEPR4-type filtering post processor 151 added onto an EPR4 system. Blocks before the post processor consist of a complete EPR4 system, post processor 151 works as an independent block: the only two inputs to post processor 151 are the 5-target-level (−2, −1, 0, 1, and 2) EPR4 sampled data and the detected bit stream output from the EPR4 Viterbi detector. This architecture allows post processor 151 to be added to a standard EPR4 system to improve the bit error rate (BER) performance without altering the EPR4 system.

FIG. 1c is a block diagram of the first preferred embodiment post processor 151. The data path of the post processor can be broken down into two parts: the ideal data path and the sample data path. The ideal data path consists of four flip-flops, two multipliers (multiply by 2), and a four-input adder. The ideal data path filters the output bit stream $X[k]$ of the EPR4 Viterbi detector (which is the maximum likelihood estimate of the bit stream initially recorded) with a filter that generates the ideal EEPR4 samples for such output bit stream:

$$Y[k]=X[k]+2*X[k-1]-2*X[k-3]-X[k-4]$$

Ideal EEPR4 samples have seven possible levels as compared to the five of ideal EPR4 samples. The EEPR4 transfer polynomial is $(1-D)(1+D)3$ which can be expressed as $(1-D)(1+D)2(1+D)$. And this is just the EPR4 transfer polynomial multiplied by $(1+D)$. Therefore, the samples input to the EPR4 Viterbi detector 125 can be converted into corresponding EEPR4 samples by filtering them with a $1+D$ filter. Thus if the samples input to the EPR4 Viterbi detector 125 are denoted as $z[k]$, the sample data path outputs $(1+D)z[k]=z[k]+z[k-1]$. FIG. 1c illustrates the ideal data path in the upper center and the sample data path in the lower left. The sample data path includes delay 153 to compensate for the delay through Viterbi detector 125 and thus synchronize with the ideal data path.

The error signal at time k, $e[k]$, is defined as the difference of the sample data path output and the ideal data path output; that is, $e[k]=(1+D)z[k]-Y[k]=z[k]+z[k-1]-Y[k]$.

Compute an error event metric $E[k]$ by passing the error signal $e[k]$ through a $(1-D)(1+D)^3$ filter; that is, $E[k]=(1-D)(1+D)^3 e[k]$ illustrated as block 155 in FIG. 1d. The error event metric is then passed through error validation block 157 to identify the position of possible single bit errors. If the error event metric $E[k]$ satisfies the following conditions, a flag will be sent to the error correction block 161 to invert the polarity of the k−5 output bit:

(1) The error event metric $E[k]$ has the same sign as the $e[k]$ input to the error sequence filter.

(2) The magnitude of error event metric $E[k]$ is larger than a preset threshold.

(3) The magnitude of error event metric $E[k]$ is a local maximum ($|E[k]|$ is larger than both $|E[k-1]|$ and $|E[k+1]|$).

FIG. 1d illustrates circuitry for testing these conditions within error validation block 157.

Jitter Analysis

Figure 5:
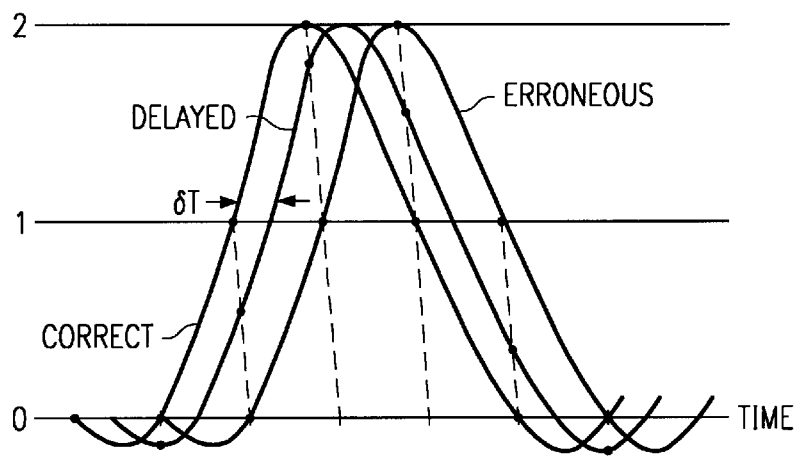
FIG. 5 has EPR4 pulses.

A heuristic analysis will help clarify the operation of the foregoing preferred embodiment post processing. A common single bit error arises from pulse jitter in which the pulse induced in a read head is offset in time; this offset may be due to raggedness of the boundary of the magnetic domains of opposite polarities. The pulse offset combined with state metric variation within the Viterbi detector can lead to the single bit detection error. In particular, presume a correct bit sequence . . . 011 . . . , an erroneous bit sequence of . . . 001 . . . , and the samples $z[k]$ as shown in FIG. 5; FIG. 5 also shows the corresponding ideal correct samples and the ideal erroneous samples. That is, FIG. 5 shows two ideal pulses and a delayed-by-jitter pulse in between the two ideal pulses.

As illustrated in FIG. 5, if an ideal pulse with samples 0, 1, 2, 1, 0 is delayed by $\delta T$ where T is the sampling interval and $\delta$ is between 0 and 0.5, then the samples change to very roughly 0, $1-1.2\delta$, $2-\delta^2$, $1+1.2\delta$, $1.2\delta$, where the 1.2 factor is an estimate of the slope of the sides of the pulse away from the top and bottom, and $\delta^2$ is an estimate of the curvature at the top of the pulse. Thus the difference between the delayed samples and the ideal correct samples is 0, $-1.2\delta$, $-\delta^2$, $1.2\delta$, $1.2\delta$.

To emphasize the two successive $1.2\delta$s (which correspond to the delay side of the correct pulse), filter with $1+D$. This yields a filtered difference of 0, $-1.2\delta$, $-1.2\delta-\delta^2$, $1.2\delta-\delta^2$, $2.4\delta$, $1.2\delta$, 0 and corresponds to e[k].

Then locate this pattern in e[k] by filtering with a filter having a transfer function of shape roughly equal to that of the pattern to be detected. The EEPR4 transfer function of $-1, -2, 0, 2, 1$ has such a shape and is convenient to use because EEPR4 hardware and software already exist. Thus apply the $-1, -2, 0, 2, 1$ filter to generate the E[k] sequence as 0, $-1.2\delta$, $-3.6\delta-\delta^2$, $-1.2\delta-3\delta^2$, $7.2\delta-2\delta^2$, $9.6\delta+2\delta^2$, $1.2\delta+3\delta^2$, $-6\delta+\delta^2$, $-4.8\delta$, $-1.2\delta$. Now as $\delta$ increases towards 0.5 (which implies the pulse is approaching an offset of one half sampling period and a high error probability), the $9.6\delta+\delta^2$ term will dominate and increase from 0 to about 5 as $\delta$ increases from 0 to 0.5. This suggests a threshold about 5 for use as condition (2) in the preferred embodiment error decision.

A similar analysis for the difference between the jittered pulse samples and the ideal erroneous samples (which equals 0, $1-1.2\delta$, $1-\delta^2$, $-1+1.2\delta$, $-1+1.2\delta$) yields E[k] as 0, $1-1.2\delta$, $4-3.6\delta-\delta^2$, $4-1.2\delta-3\delta^2$, $-4+7.2\delta-2\delta^2$, $-10+9.6\delta+2\delta^2$, $-4+1.2\delta+3\delta^2$, $4-6\delta+\delta^2$, $4-4.8\delta$, $1-1.2\delta$. Of course, this difference equals the correct bit samples difference plus the error bit samples. The term $-10+9.6\delta+2\delta^2$ dominates and its magnitude decreases from 10 to about 5 as $\delta$ increases from 0 to 0.5. This agrees with the threshold of condition (2) being set equal to 5, and an error would be properly flagged by this E[k]. Note that the other terms of E[k] never exceed 4 in magnitude. Also, the overall filtering from error bit to E[k] is $(1-D)(1+D)^3(1-D)(1+D)^3$ which has coefficients $1,4,4,-4,-10,-4,4,1$. The $-10$ coefficient has magnitude just twice the threshold, aligns with the dominate $9.6\delta+2\delta^2+\epsilon$ term, and locates the error bit. Indeed, the magnitude of the $-10$ coefficient is more than twice that of the next largest magnitude coefficient.

Figure 6A:
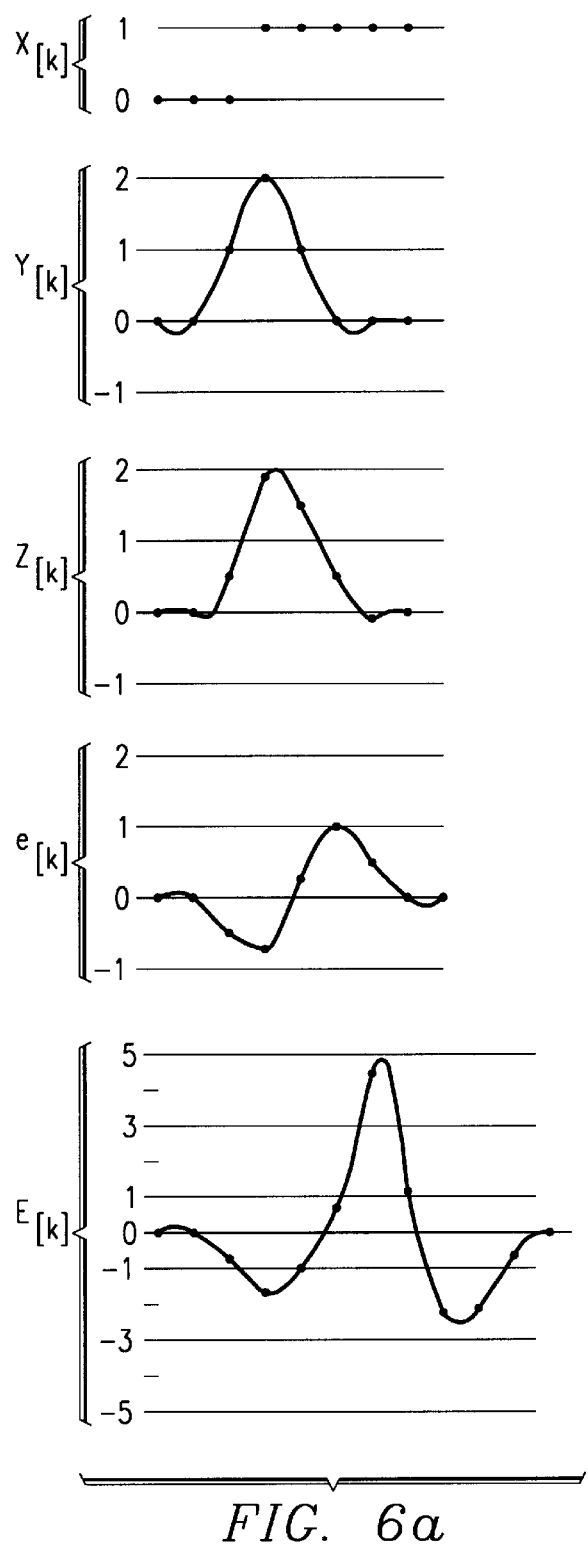
FIGS. 6a–6b illustrate post processing.
Figure 6B:
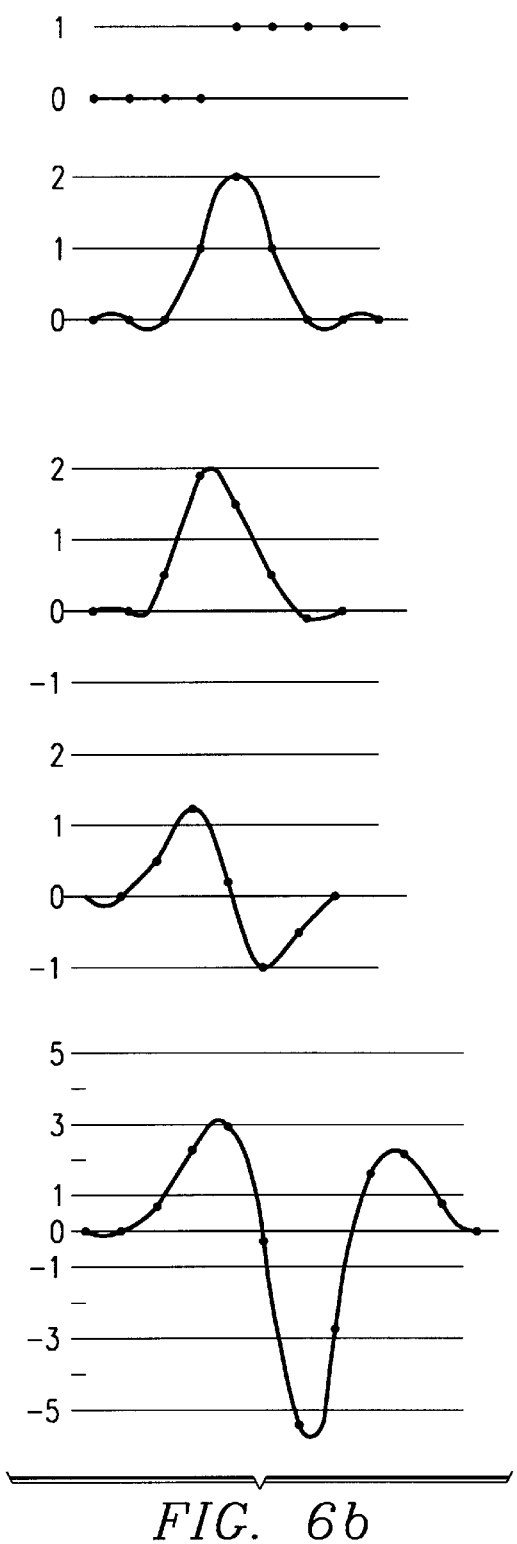

FIGS. 6a–6b numerically illustrate the foregoing with z[k] taken as roughly equal to 0, 0.5, 1.8, 1.5, 0.5, 0, as in FIG. 5. Indeed, with the correct bit sequence detected by Viterbi detector 125, the post processing would be as follows. Using a subscript C for correct, the $X_c[k]$ sequence would be 0, 1, 1, 1, . . . ; the EEPR4 $Y_c[k]$ sequence 0, 1, 3, 3, 1, 0, 0; the error $e_c[k]$ sequence 0, −0.5, −0.7, 0.3, 1.0, 0.5, 0; and the error metric $E_c[k]$ sequence 0, −0.5, −1.7, −1.1, 0.6, 4.4, 1.1, −2.3, −2.0, −0.5 where $(1+D)z[k]$ equal to 0, 0.5, 2.3, 3.3, 2.0, 0.5, 0, . . . was used. FIG. 6a illustrates these sequences and includes the ideal 0, 1, 2, 1, 0 EPR4 pulse for comparison.

Conversely, if the erroneous bit sequence is detected by Viterbi detector 125 (due to, for example, differences in previously accumulated fluctuations in state metrics), then the post processing would be as follows. Using an E subscript for error, the $X_E[k]$ sequence would be 0, 0, 1, 1, 1, . . . ; the $Y_E[k]$ sequence 0, 0, 1, 3, 3, 1, 0; the $e_E[k]$ sequence 0, 0.5, 1.3, 0.3, −1.0, −0.5, 0; and the $E_E[k]$ sequence 0, 0.5, 2.3, 2.9, −0.4, −5.6, −2.9, 1.7, 2.0, 0.5. FIG. 6b shows these sequences.

Consider the criteria for setting the error flag and inverting the output bit:

(1) e[k] and E[k] have the same sign.

(2) E[k] exceeds a threshold.

(3) |E[k]| is a local maximum.

Criteria (1) and (3) are met for $E_c[k]$ values $-1.7, 4.4$, and $-2.3$, and for $E_E[k]$ values $2.9, -5.6$, and $2.0$ (allowing 0 to be either sign). Thus setting the threshold at about 5 would correct the single bit error in that the error metric $E_c[k]$ for the correctly detected bit sequence does not set the error flag, but the error metric $E_E[k]$ for the incorrectly detected bit sequence does set the error flag.

Further Preferred Embodiments

Other filterings of e[k] could be used in place of the EEPR4 filter of $-1, -2, 0, 2, 1$ to detect the basic pattern of e[k] which has the dominate positive term (i.e., $2.4\delta$) two samples after the dominate negative term (i.e., $-1.2\delta-\delta^2$). Thus a filter such as $-1, 0, 1$ would still fit the pattern: in this case E[k] sequence would become 0, $-1.2\delta$, $-1.2\delta-\delta^2$, $2.4\delta-\delta^2$, $3.6\delta+\delta^2$, $\delta^2$, $-2.4\delta$, $-1.2\delta$. Thus as $\delta$ increases from 0 to 0.5, the dominate term $(3.6\delta+\delta^2)$ will approach about 2, so a threshold about 2 should be used. This agrees with the overall filtering of the error bit as $(1-D)(1+D)^3(1-D^2)$ which has coefficients $1, 2, -1, -4, -1, 2, 1$. Thus one-half of the largest magnitude coefficient is 2, so the threshold should be 2.

Note that for this $-1, 0, 1$ filter the ratio of the dominate term to the next largest term is $(3.6\delta+\delta^2)/(-2.4\delta)=-1.7$ as $\delta$ increases to 0.5. This matches the ratio for the $-1,-2,0,2,1$ filter of $(9.6\delta+2\delta^2)/(7.2\delta-2\delta^2)$ 1.7 as $\delta$ increases to 0.5.

Alternatively, the samples z[k] could be compared to the ideal EPR4 samples and filtered by EPR4 to generate E[k]. In this case the overall error bit filtering is $(1-D)(1+D)^2(1-D)(1+D)^2$ which is just a rearrangement of the preceding:

$$(1-D)(1+D)^2(1-D)(1+D)^2=(1-D)(1+D)^3(1-D^2).$$

Experimental Results

Figure 7:
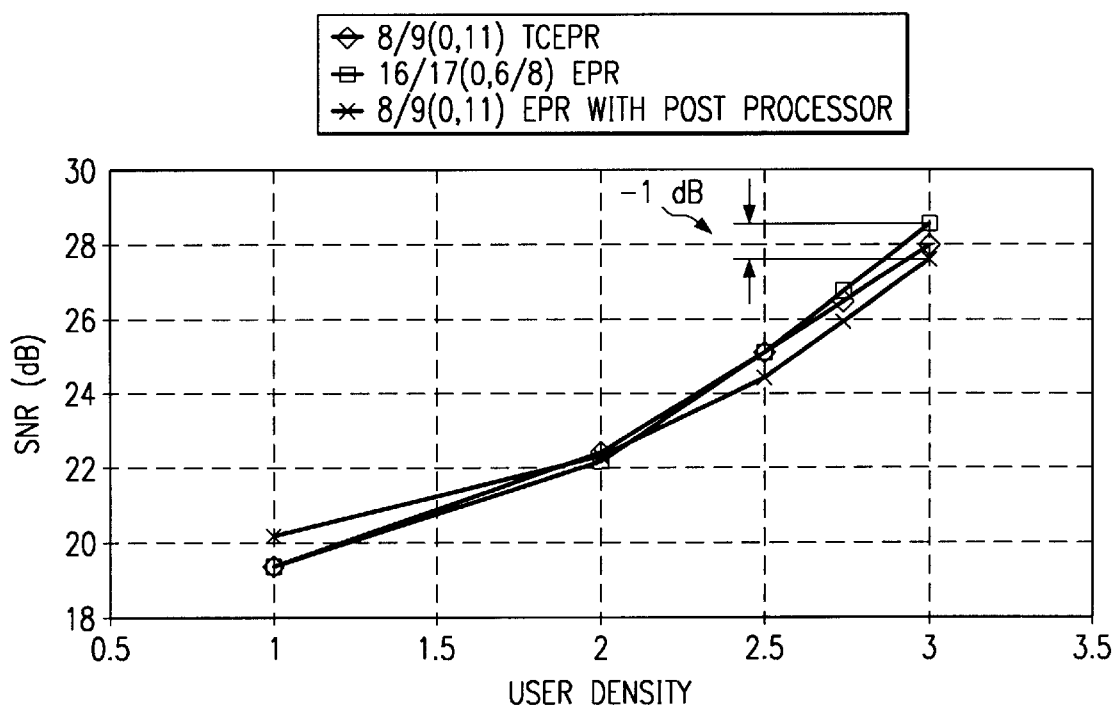
FIG. 7 is experimental results.

FIG. 7 shows experimental results for the first preferred embodiment. By removing the single bit errors from the output using post processing and removing the consecutive transition errors with trellis coding, at user density of 3.0 the preferred embodiment post processor system shows a 1 dBN gain over a 16/17 code EPR4 system.

Modifications

The preferred embodiments can be modified in various ways while retaining the feature of a single bit error detection by comparison of the filtered difference between actual samples and ideal samples from the detected bit stream. For example, the user bit density could be varied, the filtering to detect changed with corresponding changes in thresholds, and so forth.

What is claimed is:

1. A method of correcting errors, comprising:

(a) estimating information from a first sample stream which encodes information with a first encoding method;

(b) comparing the difference between (i) said sample stream after a first filtering and (ii) an ideal sample stream created from said estimated information with a second encoding method, wherein said second encoding method emulates said first encoding method plus said first filtering; and (c) correcting said estimated information of (a) when said comparison of (b) indicates an error.

2. The method of claim 1, wherein:

(a) said first encoding method is EPR4; and (b) said second encoding method is EEPR4.

* * * * *